Aug. 14, 1945.  H. F. McLOUGHLIN ET AL  2,382,647
ELECTRICAL WIRING SYSTEM
Filed May 30, 1942  8 Sheets-Sheet 1

INVENTORS:-
Harold F. McLoughlin, Walter E. Idell and
Richard W. Morgan, Thomas D.G. Wintle,
BY
Smith, Michael and Gardiner,
ATTORNEYS.

Aug. 14, 1945.    H. F. McLOUGHLIN ET AL    2,382,647
ELECTRICAL WIRING SYSTEM
Filed May 30, 1942    8 Sheets-Sheet 3

Inventors:- Harold F. McLoughlin, Walter E. Hill, Richard W. Morgan and Thomas D.G. Wintle,
By: Smith, Michael and Gardiner,
Attorneys.

FIG. 11.

Aug. 14, 1945.   H. F. McLOUGHLIN ET AL   2,382,647
ELECTRICAL WIRING SYSTEM
Filed May 30, 1942   8 Sheets-Sheet 5

Aug. 14, 1945.  H. F. McLOUGHLIN ET AL  2,382,647
ELECTRICAL WIRING SYSTEM
Filed May 30, 1942  8 Sheets-Sheet 6

INVENTORS:
Harold F. McLoughlin, Walter E.
Hill, Richard W. Morgan and
Thomas D. G. Winter,
By: Smith, Michael and Gardiner,
ATTORNEYS Aug. 14, 1945. H. F. McLOUGHLIN ET AL 2,382,647
ELECTRICAL WIRING SYSTEM
Filed May 30, 1942 8 Sheets-Sheet 7

INVENTORS:-
Harold F. McLoughlin,
Walter E. Hill, Richard W. Morgan 2nd
Thomas D. G. Wistle,
By: Smith, Michael and Gardiner, ATTORNEYS.

Patented Aug. 14, 1945

2,382,647

UNITED STATES PATENT OFFICE 2,382,647

ELECTRICAL WIRING SYSTEM

Harold Fletcher McLoughlin, Shenstone Court, near Lichfield, Walter Edward Hill, Streetly, and Richard Walter Morgan and Thomas Daniel Guy Wintle, Walsall, England; said McLoughlin assignor to J. A. Crabtree & Co. Limited, Walsall, Stafford County, England Application May 30, 1942, Serial No. 445,232
In Great Britain October 6, 1941

8 Claims. (Cl. 177—311)

This invention relates to improvements in the testing of electrical wiring systems and is principally concerned with the detection of earth faults in systems comprising a number of electrical accessories connected to a source of supply through disconnectible couplings and a distribution board or boards. For example, the invention is particularly applicable to the wiring systems of aircraft, in which mains, to which current is supplied by a generator, are connected to distribution boards which are in turn connected to junction boxes from which conductors are led to the various electrically controlled accessories and so on. The expeditious location of earth faults in such systems is of prime importance for the purpose of minimising the time in which a plane may be out of commission.

The object of the present invention is to provide an improved method of, and means for, enabling earth faults to be expeditiously detected and located in a simple manner without the necessity for the removal of fuses, negative links or terminal screws.

According to this invention the method of detecting earth faults in a wiring system comprising electrically operated apparatus connected to a source of supply through disconnectible couplings and a distribution board or boards, is distinguished by the employment in association with the latter of switches arranged not only in a group circuit but also in sub-circuits connected across such group circuit, and adapted for separately isolating the poles of the former, and for individually isolating the latter for the purpose of affording an indication, by a device connected to the mains, of an earth fault in one or more of the sub-circuits. The said device may by a visual indicator comprising an electric lamp mounted in a casing and connected with a plug insertible in a socket mounted in a distribution board. The latter may comprise a pair of group isolating switches each of which is adapted to disconnect a distribution board from one of the poles of a main circuit, which may be ring mains to which current is supplied by a generator; isolating switches disposed on the negative and positive sides being associated also with the sub-circuits leading from the board. Provision is thereby made for the individual isolation of any particular sub-circuit or circuits from the distribution boards, by operation of the appropriate switches in sequence, thereby avoiding any necessity for the removal of fuses or of screws, terminals or the like. Thus faults can be rapidly detected and located without disturbance of the wiring connections, with the resultant valuable saving in time involved in testing and servicing.

In order to enable the invention to be readily understood, reference will now be made to the accompanying drawings, illustrating by the aid of diagrams and one constructional example, the method of and means for carrying the invention into effect, in which drawings:

Figures 7 and 9 are diagrams illustrating the employment of switches according to the invention.

Figure 11:
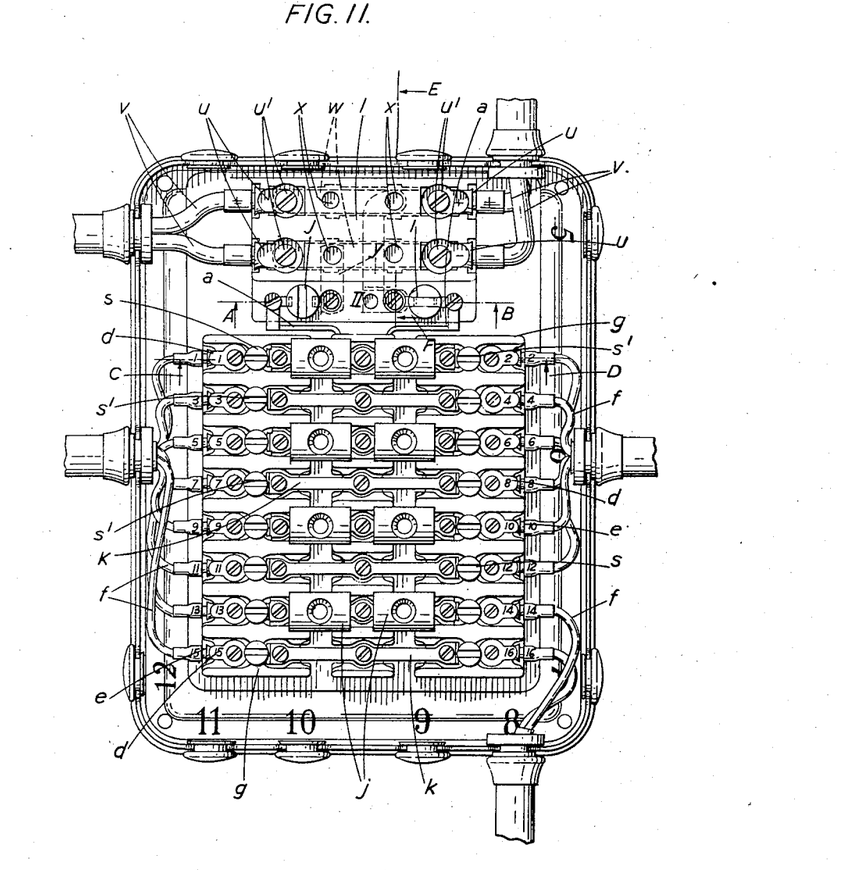
Figure 11 is a plan with the cover removed of a distribution board incorporating switches in accordance with the invention.

For the purpose of performing tests in accordance with invention there is employed a portable indicator device adapted to be connected to the mains by means of a two-pin plug which may be inserted for example into socket outlets $x$ in a fuse board $b$, Figure 11. The indicator device, which may comprise a single lamp or a pair of lamps will be hereinafter described.

Figure 1:
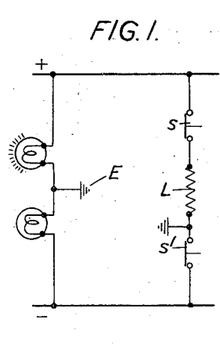
Figures 1-6 are a series of diagrams illustrating the principles on which the operation of the method, in accordance with the invention, is based.
Figure 2:
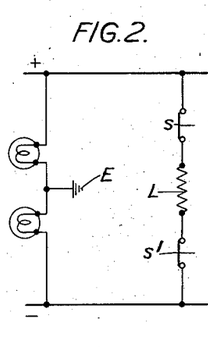
Figure 3:
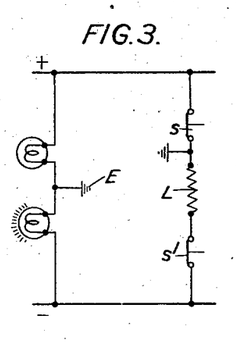

The diagrams Figures 1, 2 and 3 illustrate the employment of a twin-lamp arrangement, the load L connected across the mains having isolator switches $s$, $s^I$ in the positive and negative sides, a common earth E being provided for the lamps. Figure 2 illustrates a healthy circuit with both lamps giving only a dim light, while Figures 1 and 3 illustrate respectively an earth fault on the negative and positive sides, the appropriate lamp then brightly illuminating a sign for indicating from which main the fault is being fed.

Figure 4:
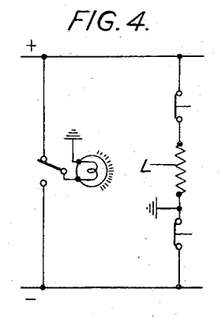
Figure 5:
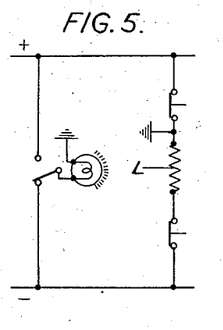

Figures 4 and 5 diagrammatically illustrate the employment of a single lamp in combination with a two-way switch, the position of the actuating element T of which serves for indicating from which main the earth is being fed.

Figure 6:
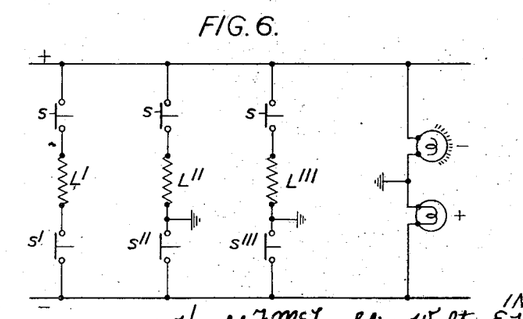

Figure 6 illustrates the connection across the mains of a number of sub-circuits two of which, for the purpose of explanation, possess faults on the negative side. The lamp indicator serves for indicating the polarity of the main from which the fault is being fed. Thereupon the isolating switches S on the positive side are switched-off so that all the positive circuits in parallel with the indicator are disconnected thereby confining further attention to the negative circuits. The latter are disconnected in sequence by individual operation of the switches $s^I$ $s^{II}$ $s^{III}$ until the operation of a particular switch causes the fault to be cleared. In the diagram, opening of the switch $s^{III}$ following opening of $s^I$ $s^{II}$ causes clearance, the reason for this being that only the last earth which is cleared gives clearance on the indicator as will be evident from examination of the diagram. Therefore, having determined that a fault is associated with the sub-circuit containing load $L^{III}$ it is necessary to re-insert the negative circuits containing $L^I$ $L^{II}$ to determine if these circuits may also be faulty. Such further examination would reveal a fault also in the circuit containing $L^{II}$. The provision of switches in accordance with this invention enables such checking to be performed simply and expeditiously without necessitating the removal of fuses or multiple pin plugs.

Figure 7:
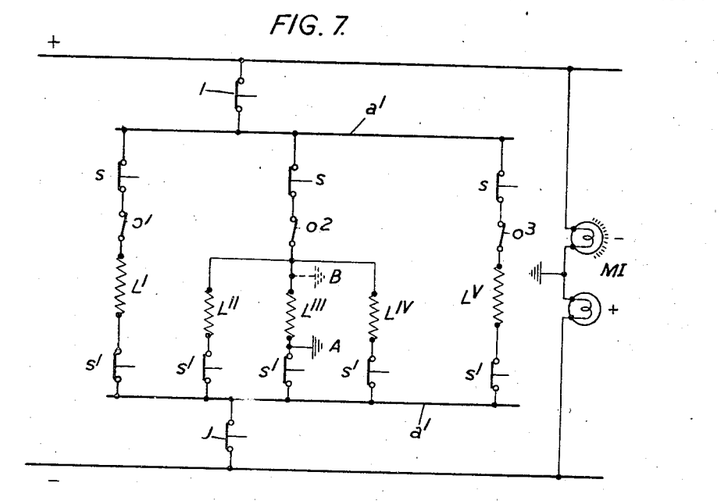
Figure 8:
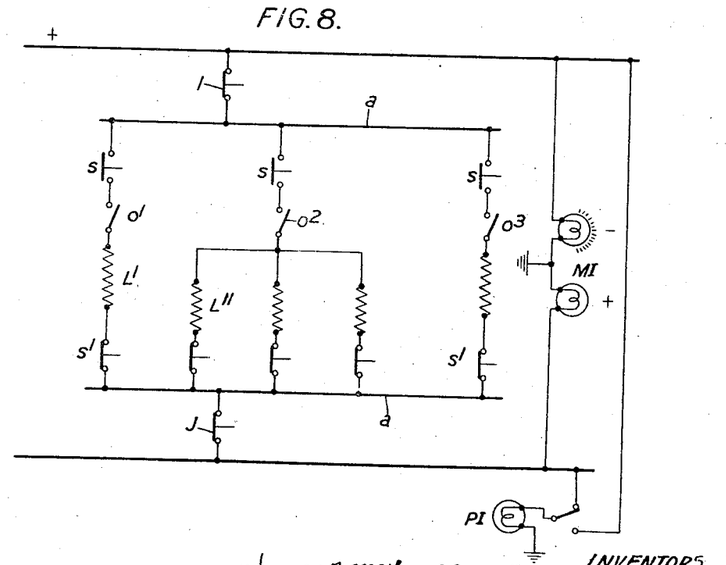

The switches just referred to are for isolating purposes when testing individual sub-circuits containing the loads. In addition to these switches there are provided group isolating switches IJ for separately disconnecting a main from a distribution board as shown in Figures 7 and 8. As illustrated in these diagrams it will be seen that a distribution board comprises a pair of bus bars $a^I$ each of which is connected to a main through a group isolating switch IJ, the sub-circuits containing the loads $L^I$ to $L^V$ being disposed in parallel across the bus-bars and having on each side thereof a sub-circuit isolating switch $s$ $s^I$ is mounted on the board. In addition each sub-circuit includes a normal operating switch $o^1$ $o^2$ $o^3$, disposed for example on the instrument panel, for controlling the load, which may be flares, navigation lights and so on. The navigating lights switch $o^2$ may control three sub-circuits namely the port, starboard and centre lights as shown.

When testing it is obvious that, while the operating switch $o^2$ for the navigation lights may be "On" or "Off" it may be essential that the switch $o^1$ in the flares circuit for example be open. In the former case, as exemplified in Figure 7, an earth fault A will cause the indicator to give a negative indication and vice versa with an earth fault B. In Figure 8, however, a negative indication will be given for a fault beyond the operating switch on either the positive or negative side, since it is to be borne in mind that the indication shown by the device is the polarity of the main from which the fault is being fed. In either case the ability to perform the necessary operations for fault detection and location irrespective of the position of the operating switches is of considerable value and the fact that the indications may be different in the respective conditions is immaterial, the testing being conducted in either case in the manner previously described.

In Figure 8 there is shown a twin lamp indicator MI and a single lamp indicator PI. The former may be incorporated in an earth indicator mounted on the pilot's dash while the latter may be a portable device associated with a plug adapted to be plugged into a mains socket $a$ mounted on a distribution board as hereinafter described.

Figure 9:
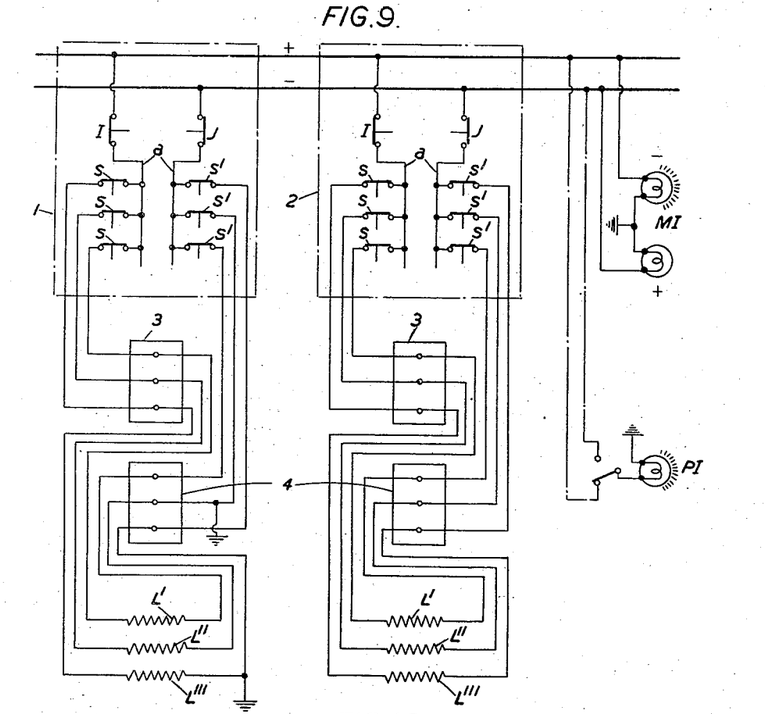
Figure 9 is a diagram showing an arrangement of two distribution boards.

In Figure 9 there are two distribution boards 1 and 2 each of the arrangements as described in Figures 7 and 8 and having connected thereto connection boxes 3, 4. For fault detection and location in such a system, the isolating switches IJ and $s$ $s^I$ on the board are employed for progressively eliminating healthy circuits from the examination so as to confine and direct attention to a faulty circuit or circuits and finally to locate the precise earthing point of the latter.

Thus assuming that the twin filament indicator MI on the pilot's dash shows a fault (on the negative side for example) the electrician follows broadly the following procedure:

(1) Ascertain by employment of the portable indicator PI the particular board to which the faulty sub-circuit is connected and isolate the other board. This excludes the circuits of the healthy board from consideration.

(2) Isolate the sub-circuits of the opposite polarity from that indicated by the device in the board under examination. This confines further attention to negative sub-circuits, assuming as pre-supposed negative indication.

(3) Determine the particular faulty sub-circuit by eliminating the healthy negative sub-circuits.

(4) Locate the particular point of the sub-circuit which is faulty.

In actual operation for testing, the plug of the portable indicator PI is inserted into the mains unit of, say, distribution board 2. This board is isolated by switching off its group isolators IJ. If the fault remains indicated the plug is then inserted into the other board 1 which is also isolated by switching off its group isolators IJ. If the indicator shows a clearance it is established that a fault exists on this board.

It will be remembered (Figure 6) that only the last fault is indicated and it is necessary to determine therefore whether or not board 2 may also be faulty. Therefore the group isolators are reclosed and assuming a healthy indication is given the fault is known to be confined to board 1. Naturally, if a fault should exist on circuits branching from each board, examination of each would proceed separately as will now be described.

Board 1 having been found to have a faulty circuit the opposite pole from that indicated is isolated. In the example under construction therefore all the positive circuits are disconnected by operation not only of the positive group isolating switch I but also of the sub-circuit positive isolators $s$. Thus all the positive circuits in parallel with the lamp on board 1 are disconnected for confining inspection to the negative sub-circuits. The latter are then disconnected in sequence by individual operation of the isolating switches $s^1$ until operation of a particular switch causes the fault to be cleared. It is possible, however, that the negative circuits which have previously been isolated may also contain faults (as mentioned in connection with Figure 6). For this reason therefore, it is necessary to re-insert the negative circuits previously isolated and perform again the operations just described. This may conveniently be performed by reinserting these negative circuits in reverse sequence leaving connected only those circuits which are healthy while disconnecting those which are faulty. In this manner all faulty circuits are discovered by simple operation of the sub-circuits isolators.

Figure 10:
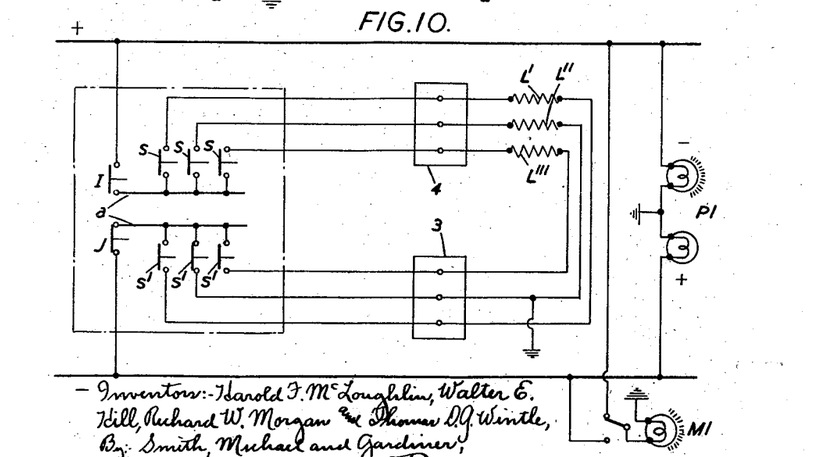
Figure 10 is a diagram of the connections beyond the boards shown in Figure 9.

It is now necessary to determine in which part of a particular circuit the fault actually exists. For this purpose a wiring diagram contained in the board is consulted and the first junction point of the faulty circuit is ascertained. This junction point and further junction points along the wire, for example, at its connection with junction boxes such as 3, 4 are successively disconnected (see Figure 10) until the fault is not cleared as shown by the lamp thereby locating the precise position of the fault.

The various isolating switches are all finger-operated to enable them to be manipulated readily and simply to enable extremely rapid fault detection and location. As previously stated such switches are mounted on the distribution boards to enable all switching operations for isolation to be performed without the necessity for removal of fuses, negative links or terminal screws thereby reducing to a minimum the time occupied in testing.

Figure 12:
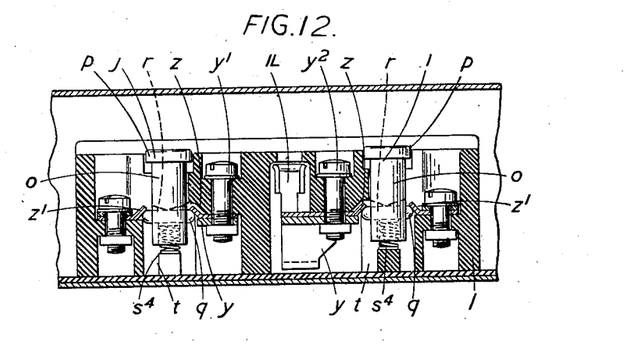
Figure 12 is a section on the line AB of Figure 11 showing the group isolating switches.
Figure 13:
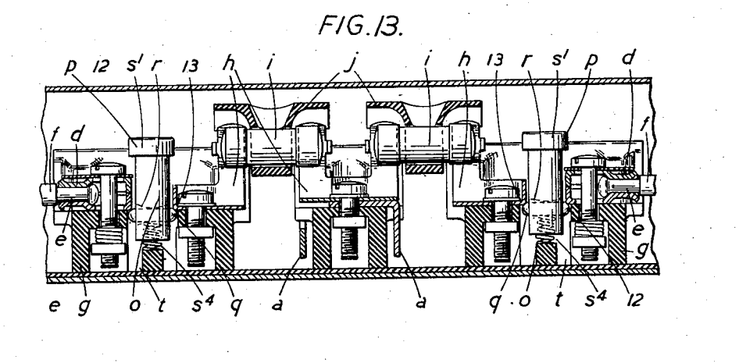
Figure 13 is a section on the line CD of Figure 11 through subcircuit isolating switches.
Figure 14:
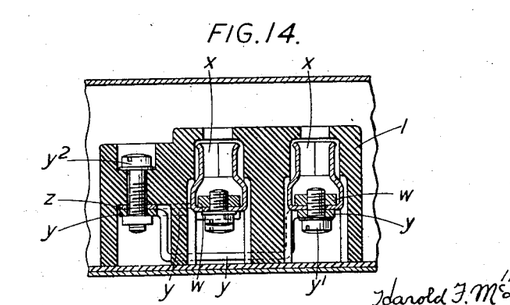
Figure 14 is a section on the line EF of Figure 11.

One example of switch is illustrated in the constructional embodiment of the invention illustrated in Figures 11, 12 and 13, showing a distribution board, comprising sockets $d$ adapted for the reception of terminals or plugs $e$ on the ends of conductors $f$ and mounted on insulating blocks $g$, these sockets being associated with clips $h$ for fuses $i$ mounted in fuse holders $j$. Alternatively, certain sockets may be connected by a strap or link $k$. In the upper part of the box there is an insulating block $l$ for receiving the mains cables $v$. The socket outlets $x$ are adapted for the plugging-in across the mains of the two pin plug associated with the portable indicator as previously described, while straps $y$ connect each main with a bus bar $a$ which has lateral extensions for connection with the fused circuits. The group isolating switches IJ are mounted in this block while the sub-circuit isolators $s$ $s^1$ are mounted in the insulating blocks $g$ containing the socket clamps. Each switch comprises a spindle $o$ having a knob $p$ and a moving contact bar $q$ for engagement with fixed contacts, as hereinbefore described. Each contact $q$ has rounded ends, and is disposed in a diametrical opening $r$ of the spindle, a spring $s^4$, disposed in a recess $t$ in the isolating block, pressing the contact into engagement with the fixed contacts. In order to operate a switch, finger pressure is applied to the knob to depress the spindle against the action of the spring $s^4$, whereupon it may be turned to bring the contact into a position at right angles to that which it originally occupied thereby disengaging the bar $q$ from the fixed contacts. The switch may be retained in the "Off" position by the engagement of the contact bar in recesses in the insulating blocks $l$.

Associated with a distribution board is an insulating block recessed at each end for the mounting of simple entry sockets $u$ for the main cables $v$, the respective negative and positive cable ends being connected by links $w$, secured by the screws $u^1$ of such sockets. Upstanding from each of these links is a pair of sockets $x$ into which may be plugged the two pin plug of the portable indicating device PI. From one of each of these sockets there extend straps $y$ one end of which is secured by the fixing screw $y^1$ for such socket while the other end is connected by another screw $y^2$ to a terminal plate $z$. Alternatively, the connector from the positive main may be a shunt. The terminal plate $z$ is associated with a similar plate $z^1$ which leads to a junction box such as 3, Figures 9 and 10, these plates constituting the fixed contacts for cooperating with the moving contacts of the group isolating switches IJ. The shunt from the positive main cable may be provided with an upstanding socket II to enable the millivolt drop to be measured when an instrument is plugged into the socket and the socket of the positive ring cable.

In the case of the sub-circuit isolating switches $s$ $s^1$ the moving contact co-operates with a shaped formation 12 on the end of the lower member of a socket and with a terminal plate 13 in the case of a single entry socket. For the straight-through connection socket the switch is disposed between separated socket pairs so that in one position it constitutes a connection between them while breaking such connection when depressed and turned through 90°. A similar arrangement is adopted for the combination of a fuse clip with a socket, the switch being disposed between a fuse clip and a socket constituted for a single entry.

Figure 15:
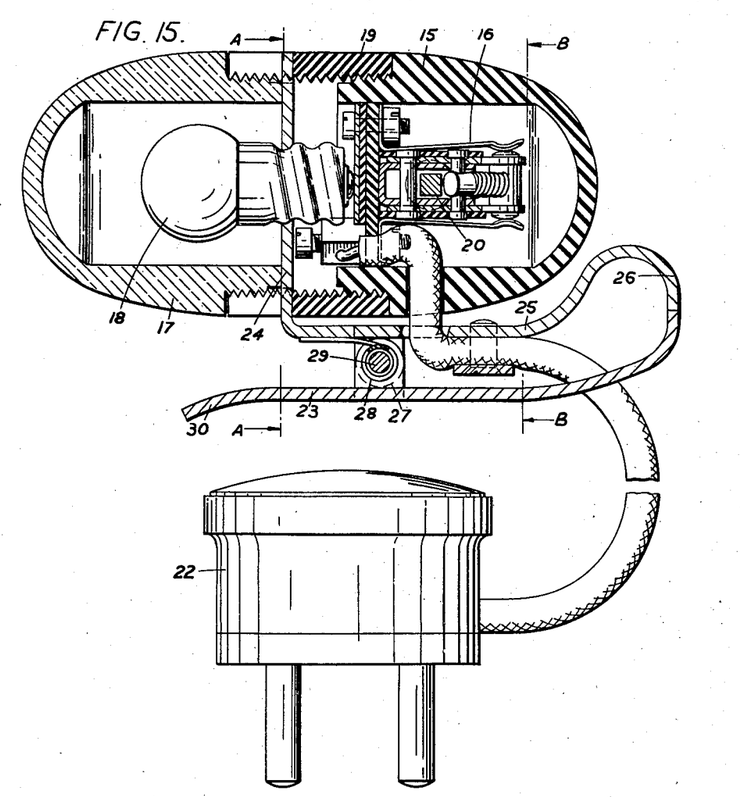
Figure 15 is a sectional elevation of a single lamp indicator device incorporating a two-way switch.
Figure 16:
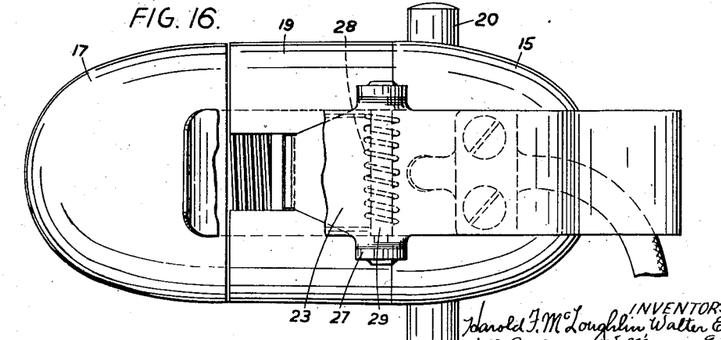
Figure 16 is an inverted plan view with parts broken away of Figure 15.
Figures 17, 18:
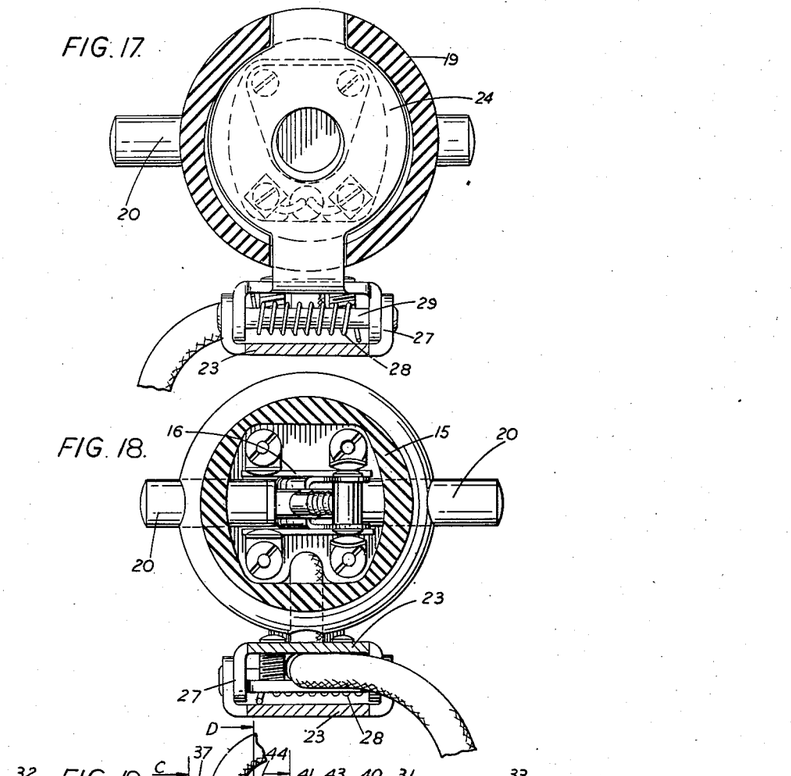
Figures 17 and 18 are sections on the lines AA and BB respectively of Figure 15.
Figure 19:
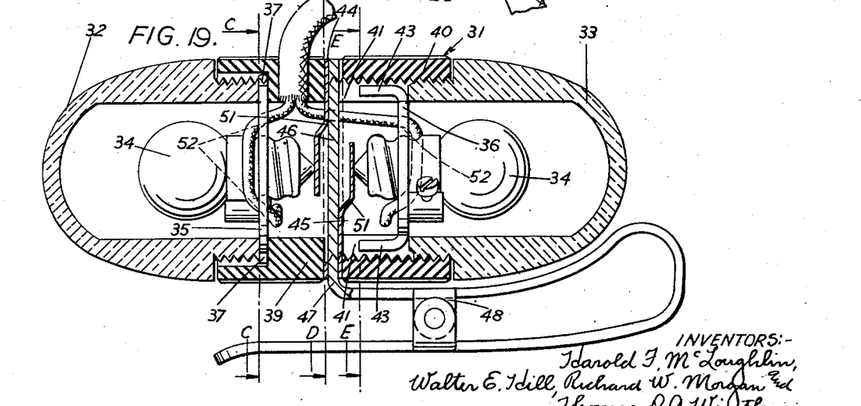
Figure 19 is a sectional elevation of a twin-lamp indicator device.
Figures 20, 21, 22, 23:
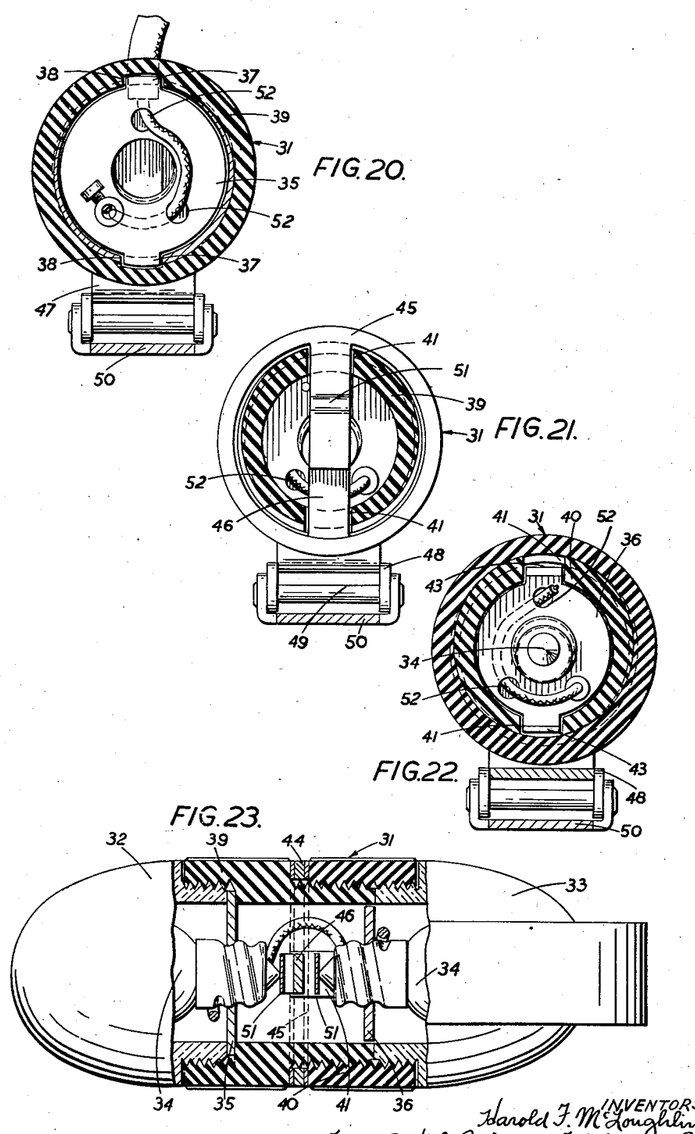
Figure 20 is a section on the line CC of Figure 19.
Figure 21 is a section on the line DD of Figure 19.
Figure 22 is a section on the line EE of Figure 19.
Figure 23 is an inverted plan with parts in section of Figure 19.

Referring to Figures 15–18 the device comprises a two-part ellipsoidal casing, one part 15 housing a two-way switch 16 of known construction and the other part 17 of translucent material accommodating a lamp 18. The parts 15, 17 are screwed into a sleeve 19. The switch 16 is operated in known manner by a slidable bar 20 for connecting the lamp with either the positive or negative main as illustrated in the diagram Figures 4 and 5. One lead from the lamp is connected through the switch to a two-pin plug 22 adapted to be introduced into a socket on a distribution board. The casing is provided with a pivotal lever or carrier 23 which constitutes not only a mounting means for the portable casing but also an earthing clip for engagement with a part of the structure adjacent the circuit undergoing test, thereby affording a return lead from the lamp. This mounting means comprises a plate 24 apertured for the insertion of the lamp and formed with an arm 25 with a hook-like end 26 against which the bent extremity of the lever 23 abuts. This lever is pivotally mounted on a bracket 27 which is associated with a helical spring 28 coiled around the pivotal pin 29 for maintaining the parts in the position for clipping engagement as seen in Figure 15. The shaped end 30 of the lever serves not only for a prod for performing continuity tests but also as a handle for opening the clip against the action of the spring to release the mounting from the part of the structure to which it is clipped. The slidable bar 20 is provided with appropriate markings for indicating, according to which end projects from the casing whether an earthing fault exists on the negative or positive side.

In Figures 18-23 a casing 31 of ellipsoidal shape has end parts 32, 33 of transparent or translucent material of contrasting colour or comprising an appropriate sign so that illumination of either lamp 34 serves for indicating from which main, an earth is being fed, (see diagram, Figures 1-3). Each lamp is mounted in a plate 35, 36, the plate 35 having radial lugs 37 engageable in recesses 38 in a circular holder 39. The latter is screw threaded internally for receiving the threaded end of the translucent part 32, while a ring 40 is screwed on to an externally threaded part of this holder. The other translucent part 33 is secured into the ring 40 which is slotted at 41 for receiving bent ends 43 of the plate 36 so as to ensure the non-rotatable mounting of the latter. Around a reduced part of the ring 39 there is disposed an annular metal part 44 clamped in position between contact plates 45 by the screwing on of the ring 40. This annular part 44 is provided with a diametrical web 46, which is introduced through the slots 41 in the ring 40 and has an arm 47 extending externally of the translucent member 33. The arm is formed with a bracket 48 having a pivot pin 49 on which is pivotally mounted a clip 50, such arrangement affording an earthing means and a common return for either lamp. Each contact plate is bent outwardly at 51 to provide a resilient blade for engagement with a lamp terminal. The conductors, connected to a two pin plug (not shown) adapted for connection across the mains, are introduced into the casing through an opening in the holder 39, each conductor being threaded through three apertures 52 in a plate 35, 36 for the purpose of avoiding disadvantageous pull on a conductor.

It will be evident from the diagram Figures 1, 2 and 3 that in the event of an earth one of the lamps is illuminated for indicating the existence of a fault.

We claim:

1. An electrical wiring system in accordance with claim 7, in which each switch comprises a spring projected spindle having a knob and a contact bar for engagement at each end with fixed contacts, the bar being disposed in a diametrical opening of the spindle and a spring engaging said spindle for normally pressing said contact for into engagement with the fixed contacts.

2. Means for indicating the presence of earth faults in electrical wiring systems in accordance with claim 5, wherein said electrical signal device comprises a portable lamp casing associated with a plug adapted to be connected to the main feed lines, said casing being provided with lamp means for indicating the main from which the fault is being fed, and having a mounting clip electrically connected to one terminal of said lamp means and adapted for serving also as an earth return means for the lamp means.

3. Means for indicating the presence of earth faults in electrical wiring systems in accordance with claim 5, wherein said electrical signal device comprises a portable casing containing a single lamp and provided with means for grounding one terminal of the lamp, and a switch associated with the casing for selectively connecting the other terminal of the lamp filament with either main, and actuating means on the switch projecting beyond the casing for indicating the polarity of the main from which the earth is being fed.

4. Means for indicating the presence of earth faults in electrical wiring systems in accordance with claim 5, wherein said electrical signal device comprises a portable casing containing a pair of lamps adapted for indicating the polarity of the main from which the earth is being fed, a mounting clip on said casing adapted for serving also as an earth return for said lamps, and lamp terminals engageable with blades in contact with a common connection for clip.

5. Means for the detection and location of faults in electrical networks comprising a distribution board, main feed lines mounted on the board, auxiliary bus bars electrically connected to the main feed lines, a portable electrical signal device adapted to be mounted on the board, quick-detachable means for operably connecting the signal device with the said feed lines to indicate a ground fault on any circuit connected thereto through said bus bars, means for removably mounting the signal device on the board including means for grounding one terminal of said signal device, a plurality of pairs of circuit connectors mounted on the board, means electrically connecting the circuit connectors of each pair to the auxiliary bus bars, respectively, said connecting means each including a switch, whereby either side of any of the circuits connected to said circuit connectors may be isolated from the respective bus bars by selective operation of said switches.

6. The apparatus described in claim 5 wherein switches are provided in the connections between the auxiliary bus bars of the main feed lines whereby either side of all of the circuits connected to said circuit connectors may be simultaneously isolated from said feed lines by proper operation of said switches.

7. Fault testing apparatus for an electrical network comprising a distribution board, main feed lines mounted thereon, an outlet socket on the board having plural pin receiving contacts connected respectively to said feed lines, auxiliary bus bars on the board, means electrically connecting said bus bars to said feed lines respectively, conductor socket members mounted on the board and each adapted to receive a plug terminal of a circuit conductor, plural pairs of fuse supporting clips, one clip of each pair being electrically connected to a bus bar and the other clip of each pair being respectively mounted in operative relation to said conductor sockets, a switch operatively interposed between each said conductor socket and its associate fuse clip, means for mounting the several switches for selectively connecting and disconnecting respective conductor sockets and fuse clips, a fuse mounted in each pair of clips, and a portable indicator device having a two-pin connector plug for connection with the pin receiving contacts of said outlet socket, means for electrically grounding said indicator device and switch means operatively interposed between the main feed lines and each auxiliary bus bar whereby all circuit conductors connected to either auxiliary bus bar may be simultaneously isolated from said main feed lines, in groups, and said circuit conductors may be individually isolated from each auxiliary bus bar selectively to determine the location of an existing ground fault in some one of said circuits.

8. Means for the detection and location of faults in electrical wiring systems in accordance with claim 5, wherein said switch members each comprises a switch plunger adapted to be depressed for breaking a circuit and to be turned about its own axis for maintaining said circuit open, and wherein each switch plunger has on its lower end a first contact normally in circuit closing position with respect to complementary fixed contacts, each said plunger being depressible, against the action of a spring normally effective to maintain the plunger projected, for effecting disengagement of said first contact from said complementary fixed contacts, and wherein said complementary fixed contacts are electrically connected respectively with the auxiliary bus bars and with said circuit connectors.

HAROLD FLETCHER McLOUGHLIN.
WALTER EDWARD HILL.
RICHARD WALTER MORGAN.
THOMAS DANIEL GUY WINTLE.